Jan. 14, 1936.  H. O. BOWSER  2,027,956
AIR HOSE COUPLING FOR TIRES
Filed Dec. 18, 1934

Harley O. Bowser
INVENTOR
BY Victor J. Evans & Co.
ATTORNEY

Patented Jan. 14, 1936

2,027,956

UNITED STATES PATENT OFFICE 2,027,956

AIR HOSE COUPLING FOR TIRES

Harley O. Bowser, South Bend, Ind.

Application December 18, 1934, Serial No. 758,099

1 Claim. (Cl. 284—18)

The invention relates to an air hose coupling for tires and more especially to tire valve depressing pump couplings.

The primary object of the invention is the provision of a coupling of this character, wherein the same when joined with the valve stem of a pneumatic tire, on the compression stroke of the pump, air will be forced into the tire as the valve within the valve stem will be automatically unseated to avoid any interference or blocking of the air during the compression stroke of the pump.

Another object of the invention is the provision of a coupling of this character, wherein the construction in its make-up is of novel form so as to assure positiveness in action for the supplying of air under compression to a pneumatic tire through the valve stem and for the automatic unseating of the valve within the valve stem under the compression stroke of the pump so that easy pumping action is assured.

A further object of the invention is the provision of a coupling of this character, which is simple in its make-up, thoroughly reliable and efficient in its purpose, readily and easily applied to and removed from a valve stem of a pneumatic tire, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
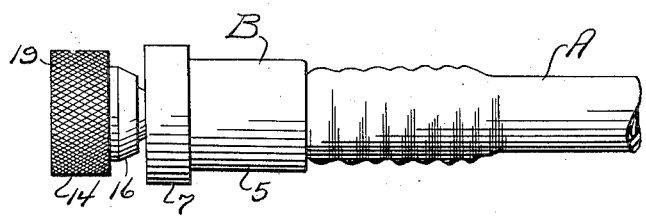
Figure 1 is a fragmentary side elevation of a pump hose showing the coupling constructed in accordance with the invention applied thereto.
Figure 2:
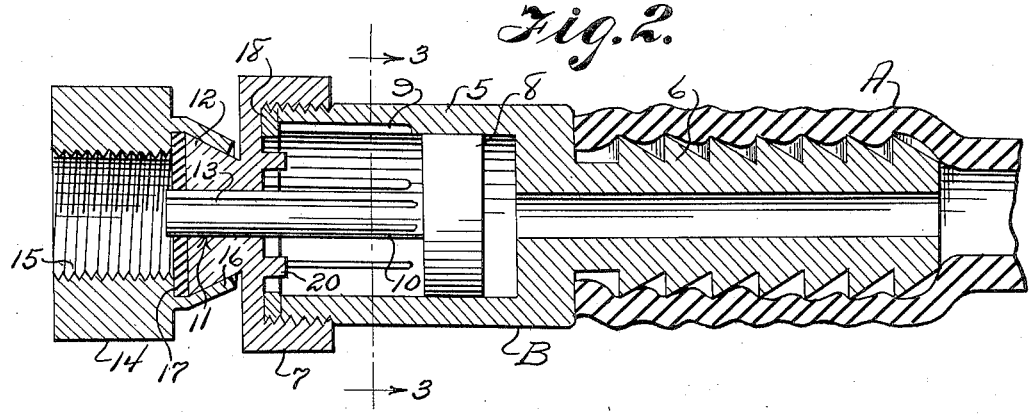
Figure 2 is an enlarged vertical longitudinal sectional view thereof.
Figure 3:
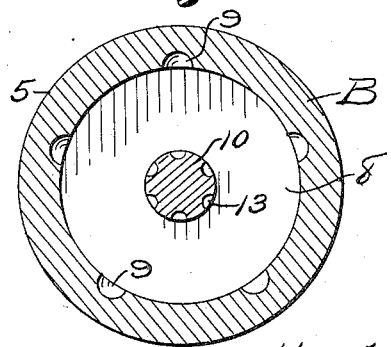
Figure 3 is a sectional view on the line 3—3 of Figure 2 looking in the direction of the arrows.

Referring to the drawing in detail, A designates a portion of a rubber hose for a pump and B the coupling constituting the present invention and hereinafter fully described. This coupling B comprises a cylindrical body 5 having formed at its inner end a reduced externally roughened or threaded connector nipple 6 for firm fitting with the hose A interiorly thereof, while the opposite open end of the cylindrical body has externally threaded thereon a cap 7 and this body constitutes a piston cylinder for a piston 8.

The internal wall of the cylinder has spaced longitudinally directed air delivering channels or grooves 9, these extending from the open end to a point midway of the length of the body 5, while the piston 8 has the central stem portion 10 which plays through a center clearance or bore 11 opening through an enlargement 12 on the cap 7. This stem 10 is formed therein with spaced longitudinally disposed air delivering vents, channels or grooves 13 so that air finding a way through the channels or grooves 9 in the wall of the body 5 will pass through the vents, channels or grooves 13 in the stem 10 for discharge from the coupling into a valve stem of a pneumatic tire when the coupling is attached thereto.

The enlargement 12 on the body 7 which is circular in form is inwardly tapered for the swiveled connection of an attaching member 14, the latter having the internally threaded central opening 15 for engaging upon the valve stem of a pneumatic tire (not shown) and into this opening 15 is adapted to be projected the stem 10 of the piston 8 under compression stroke of a pump (not shown), of which the hose A is a part. The purpose of projecting the stem 10 into the opening 15 is for its contact with the valve within the valve stem (not shown) for the tire to unseat said valve so that air under pressure can be delivered to said tire.

The member 14 is swiveled to the enlargement 12 on the cap 7 by a crimped annular flange 16 on the member 14, there being housed by this flange a washer 17 which closes the joint between said member 14 and the enlargement 12 of the coupling. Likewise, the cap 7 carries a washer 18 which seals the latter upon the body 5 to avoid escape of air at the joint between the cap and said body.

The piston 8 working within the body 5 functions as a valve and on the compression stroke of the pump this piston 8 moves outwardly in the body 5 so that air under compression may pass the said piston 8 into the channels or grooves 9 and thence flow through the channels or grooves 13 in the stem 10 of said piston for delivery through the member 14 into the valve stem of the tire. The outward movement of the piston 18 projects its stem 10 for the unseating of the valve in the stem of the tire so that air may freely flow thereinto instantly on the compression stroke of the pump.

The swiveled connection of the member 14 with the enlargement 12 on the cap 7 of the coupling permits the convenient engagement of said member 14 with the valve stem of the tire and the disengagement of this member from said stem, the said member 14 being formed with a knurled external surface 19 to enable a firm grip to be had on the member for the turning thereof.

The cap interiorly thereof carries stops 20 which limit the outward movement of the piston 8 and prevent the closing of the grooves or channels for the delivery of air by the said piston on the outward movement thereof.

What is claimed is:

A coupling of the character described comprising a body forming a piston chamber having a straight cylindrical wall, a cap fitted with the body and having an external enlargement, a piston movable in the chamber and having peripheral contact with its wall throughout, a longitudinally grooved stem on the piston working through the enlargement, the wall of the chamber being formed with air channels extending for substantially one-half the length of said chamber for cooperation with the grooves in the stem of the piston, an attaching member swiveled to said enlargement and protruded stops on the cap and projecting into the chamber for contact by the piston to provide communication between the grooves in the wall and stem when the piston has moved close to said cap.

HARLEY O. BOWSER.